United States Patent [19]

Keeney

[11] Patent Number: 5,011,612

[45] Date of Patent: Apr. 30, 1991

[54] DEWATERING OF ALUMINA TRIHYDRATE

[75] Inventor: Mark Keeney, Bentley, Australia

[73] Assignees: Industrial Minerals Research & Development Pty. Ltd., Bentley; Nabalco Pty. Ltd., Sydney, both of Australia

[21] Appl. No.: 407,667

[22] Filed: Sep. 15, 1989

[51] Int. Cl.$^5$ .............................................. B01D 37/03
[52] U.S. Cl. ................................. 210/712; 210/727; 210/728; 210/772; 423/130
[58] Field of Search .................... 423/130, 121, 122; 210/712, 727, 728, 730, 772

[56] References Cited

U.S. PATENT DOCUMENTS

| | | | |
|---|---|---|---|
| 2,701,751 | 2/1955 | Porter | 423/121 |
| 2,975,123 | 3/1961 | Head | 210/728 |
| 4,113,466 | 9/1978 | Weston | 75/2 |
| 4,410,431 | 10/1983 | Roe | 210/728 |
| 4,737,352 | 4/1988 | Owen et al. | 423/130 |

Primary Examiner—Peter Kruskoci
Assistant Examiner—Krisanne Shideler
Attorney, Agent, or Firm—Alexis Barron

[57] ABSTRACT

This invention relates to a method of improving the dewatering of alumina trihydrate obtained by the Bayer process. The method comprises treating the alumina trihydrate with the product of mixing an alkaline liquor and a $C_8$ to $C_{20}$ fatty acid, fatty acid precursor such as an ester or amide, or a fatty acid blend. The product, a fatty acid salt, is an effective dewatering aid.

The alumina trihydrate may be washed with a liquor including said product, or the product may be added to a Bayer liquor slurry prior to filtration of the alumina trihydrate.

The invention also contemplates a watering aid consisting of the product of mixing an alkaline liquor with a $C_8$ to $C_{20}$ fatty acid or fatty acid precursor.

18 Claims, 11 Drawing Sheets

KEY
□ Priolene
△ Drimax

KEY
□ Priolene
△ Drimax

DEWATERING OF ALUMINA TRIHYDRATE

This invention relates to improved dewatering methods and agents for use in dewatering operations in mineral processing.

With the steep rise in energy costs during the past few years, there is often considerable scope for cost savings in many mineral processing operations by optimizing filter cake dewatering. Benefits from improvements in dewatering efficiency include:

(a) energy savings associated with lower moistures in filter cakes requiring thermal drying;
(b) lower transportation costs from reduced bulk;
(c) greater recovery of valuable process liquor;
(d) reduction in impurities due to reduced liquor entrainment.

Dewatering is the final step in the filtration of most mineral slurries. Filtration results in a low proportion of residual moisture in the filter cake, while dewatering is used to effect further moisture content reduction. However, the fundamental principles underlying the two processes are completely different.

Filtration is the most frequently employed solid/liquid separation method in mineral processing where recovery of large amounts of solids from highly concentrated slurries is the main requirement. In this process, a solid/liquid mixture is fed onto a rigid mesh which captures the solid particles but permits the liquid to pass through. The solids deposit and a filter cake builds progressively throughout filtration. The accumulated layer of material reduces the capacity and filtration speed of the liquid.

Once the excess fluid level reaches the top of the saturated filter cake, dewatering will commence providing that a critical applied pressure differential, known as the threshold pressure, has been exceeded. When the voids in a filter cake are completely filled with liquid, the cake is said to be saturated. Saturation (S) is expressed in terms of the fraction of voids filled with liquor. Hence, for a completely dry cake $S=0$ and for a completely saturated cake $S=1$. Complete moisture removal by dewatering is in a practical sense not attainable.

Solid/liquid separation processes may be divided into pre- and post-treatment stages. Pre-treatment refers to modifications in the physical and chemical properties of the solids and liquid prior to filtration while post-treatment refers to washing and dewatering of the filter cake.

The pre-treatment processes involve three types of action:

(1) Action on the solids - In certain filtration processes, 'filter aids' are added to the slurry. Filter aids may be either solids used to improve porosity or chemical reagents used to improve filter cake drainage. Reagents ere typically coagulants or flocculants used to control the 'size' of the particles. The reagents increase the effective particle size in the slurry by aggregation of the fine particles. However, it is common for water to be retained within flocculated structures thereby increasing the moisture content. Polyacrylic acids (PAA) are widely used flocculants in alkaline systems and are often very effective on negatively charged particles. Where a crystallization process is employed, crystal modifying additives may be used to alter particle shape. Generally, blocky crystals undergo filtering and sedimentation at a faster rate than other shapes.

(2) Action on the solids concentration - An increase in the solids concentration of a slurry generally increases cake production and throughput. However, the specific resistance of many filter cakes is lower at low slurry concentrations, reaches a maximum at some critical concentration and then decreases again at higher concentrations. Therefore, it is important to ensure a balance between cake production and specific cake resistance.

(3) Action of the liquid - Filtrate viscosity is one of the most important factors in decreasing moisture content. An increase in temperature is usually the only practical method for reducing viscosity. However, polymeric viscosity modifiers have proved useful in some systems.

Post-treatment - Filter Cake Washing

The removal of residual fluid containing dissolved solutes from the pores of filter cakes is important in many mineral processes. Washing is necessary to remove liquid impurities from a valuable solid product or to improve the recovery of a valuable liquid product from the waste cake. The efficiency of the washing process depends on a number of factors. These include the amount of wash water, the concentration of surfactant in the wash, the rate of washing, the method wash application, the filter cake thickness and the distribution of pressure in the surface of the cake. If cracks form which cause channelling, inadequate separation of the mother liquor from the solid will result.

Not all the pores in a filter cake are accessible during simple displacement washing and this together with the effects of adsorption of dissolved solute onto the mIneral cake, produces a wash requirement greater than one void volume. Transfer of solute from zones inaccessible to the flow of liquid becomes diffusion controlled and long wash times are required. Long wash times and large volumes of wash water are often not available on rotary vacuum filters. Often circulating liquors must be restored to their original concentrations, therefore large volumes of washwater are undesirable due to subsequent energy demands in removing this added water. In these systems more effective use of wash water is necessary (e.g., use of more than one wash. Alternatively, when wash requirements are too expensive or prolonged, the filter cake may be reslurried and then filtered.

Drainage aids are used by the alumina industry to improve filtration efficiency by reducing hydrate moistures. Significant savings can be achieved in the plant by improved dewatering and deliquoring of hydrate as a result of reduced moisture levels and lower energy costs in calcination.

A wide range of variables affect the dewatering of the hydrate. These include slurry temperature, filtrate surface tension, solid/liquid contact angle, pressure gradient across the cake and particle size distribution and shape.

Ideally, a drainage aid formulation should reduce surface tension and increase both contact angle and pressure gradient across the filter cake. The drainage aid formulation must also be cost effective and have no detrimental down-stream effects on other plant operations.

One of the most important findings of recent years in terms of filter cake post-treatment is that the addition of small quantities of surface active agents (surfactants) to the wash water often results in filter cakes of significantly lower residual moisture. Surfactants reduce the surface tension of the liquor allowing the liquor to drain more easily from the filter cake. However, surfactants can also adsorb at the interface of a solid/liquid system thereby altering the contact angle (Θ) of the solid surface. Contact angle controls the ease with which a liquid wets a solid surface which is in contact with it. If the solid does not wet readily, then filtration will be impeded and a high pressure will be required to initiate the flow of liquid.

The structure of the surfactant is an important factor with respect to adsorption processes. It is usually the polar group which determines the extent to which the surfactant will adsorb onto a mineral surface; however, in some mineral systems, significant adsorption can occur through the non-polar group.

The adsorption of a surfactant onto a mineral surface with its polar group toward the surface and its hydrocarbon chains oriented towards the bulk water would render the mineral surface more hydrophobic.

Most commercial dewatering aids are expensive surfactant blends containing alkylsulfosuccinates, alkyl aryl sulfonates, or ethoxylated alcohols. However, dewatering aids used on oxide minerals sometimes contain an inexpensive fatty acid component (e.g., oleic, linoleic, tallow, etc.).

An emulsifier is usually required if a fatty acid is incorporated in a dewatering aid to ensure effective coating of the fatty acid on the surface of the mineral. The emulsifier is chosen on the basis of its suitability in the liquor to disperse the particular fatty acid.

It is commonly assumed that the role of fatty acids in dewatering aids is to modify the wetting characteristics of the mineral surface rendering it more hydrophobic. However, fatty acids can act as defoamers, countering the detrimental foaming tendencies of most surfactants used in dewatering aids.

Fatty acids themselves are not generally considered to be surfactants because of their extremely low aqueous solubility.

It is an object of this invention to provide a method and a dewatering aid to provide effective and economic dewatering treatment, using fatty acids without the need for additional surfactants and/or emulsifiers.

In one aspect of the present invention therefore there is provided a method of improving the dewatering of alumina trihydrate obtained by the Bayer process, wherein the alumina trihydrate is treated with a product of mixing an alkaline liquor preferably caustic, and a $C_8$ to $C_{20}$ fatty acid or fatty acid precursor, such as an ester or an amide. Blends of fatty acids or precursors are also useful. The product, a fatty acid salt, or causticised fatty acid, is an extremely effective dewatering aid. The content of the fatty acid is preferably at least 5 grams per ton of alumininum hydroxide (filtered).

As an alternative to adding the additive to the washing liquor it may be added to the Bayer liquor slurry prior to the filtration step.

If a fatty acid salt were to be used, rather than formed in situ as outlined above, increased handling would be involved as the salts are usually powders which need to be dissolved prior to addition to the washing liquors and thus increased storage is required. By using normally liquid fatty acids this problem is avoided.

The fatty acid salt can be effectively and easily generated in line by small caustic additions to the wash liquor prior to the addition of the fatty acid. An in-line mixer may facilitate the conversion to the fatty acid salt.

Alternatively, a small fatty acid salt solution make-up facility can be installed to convert the fatty acid into the appropriate salt similar to a dry-polymer make-up facility using spent process liquor or by making small alkaline additions.

The preferred fatty acids are those derived from natural sources, for example tallow, tall oil and oleic acid. Because these are readily available inexpensive products which are as effective as the prior art surfactant compositions significant cost savings can be made.

The present invention is predicated on the discovery that the fatty acid is rendered into a soluble form using readily available alkali.

As an example of the present invention the fatty acid in the form of oleic acid may be added to the plant condensate coming from the steam condensers. This condensate may be alkaline and is sufficient to render the oleic acid soluble. The thus treated condensate liquor is then used as a wash liquor at the vacuum filtration plant. Usually additional alkali in the form of spent Bayer process liquor is added with the oleic acid to the condensate. The spent liquor which contains caustic soda increases the alkalinity of the wash liquor and converts the fatty acid into the water soluble sodium salt, for example sodium oleate. This unlike the fatty acid is an extremely effective dewatering aid. Since sodium salts of fatty acids are very soluble, this eliminates the need for surfactants and emulsifiers which can be up to five times the cost of fatty acid. The amount of fatty acid required is preferably from 5 to 100 grams per ton of aluminium hydroxide (calculated as $Al_2O_3$) filtered.

The optimum quantity of fatty acid is approximately 50 to 70 grams per ton of aluminium hydroxide. Larger amounts generally produce no improvement in dewatering and smaller concentrations produce less dewatering.

The invention will now be further illustrated with reference to several comparative experimental procedures.

EXPERIMENTAL

The experimental procedure was modelled on the product hydrate dewatering operations at a typical alumina refinery.

The operating parameters for the horizontal disc filters were reproduced as accurately as possible on the experimental filtration rig. The conditions used for all the laboratory tests are shown in Table 1.0.

TABLE 1.0

| Plant and laboratory parameters during dewatering tests | | |
|---|---|---|
| PARAMETER | PLANT CONDITIONS | LABORATORY TEST |
| Cake Thickness | 8-9 cm | 8-9 cm |
| Feed Slurry Density | 700-800 g/L | 550 mLs spent liquor + 850 g product hydrate |
| Wash water temp. | 80-90° C. | 80-90° C. |
| Wash water rates | 18 kL/hr condensate | 300 mL condensate |
| 1st wash composition | Recycled 2nd wash | 10% spent liquor 90% condensate |

Figure 1:
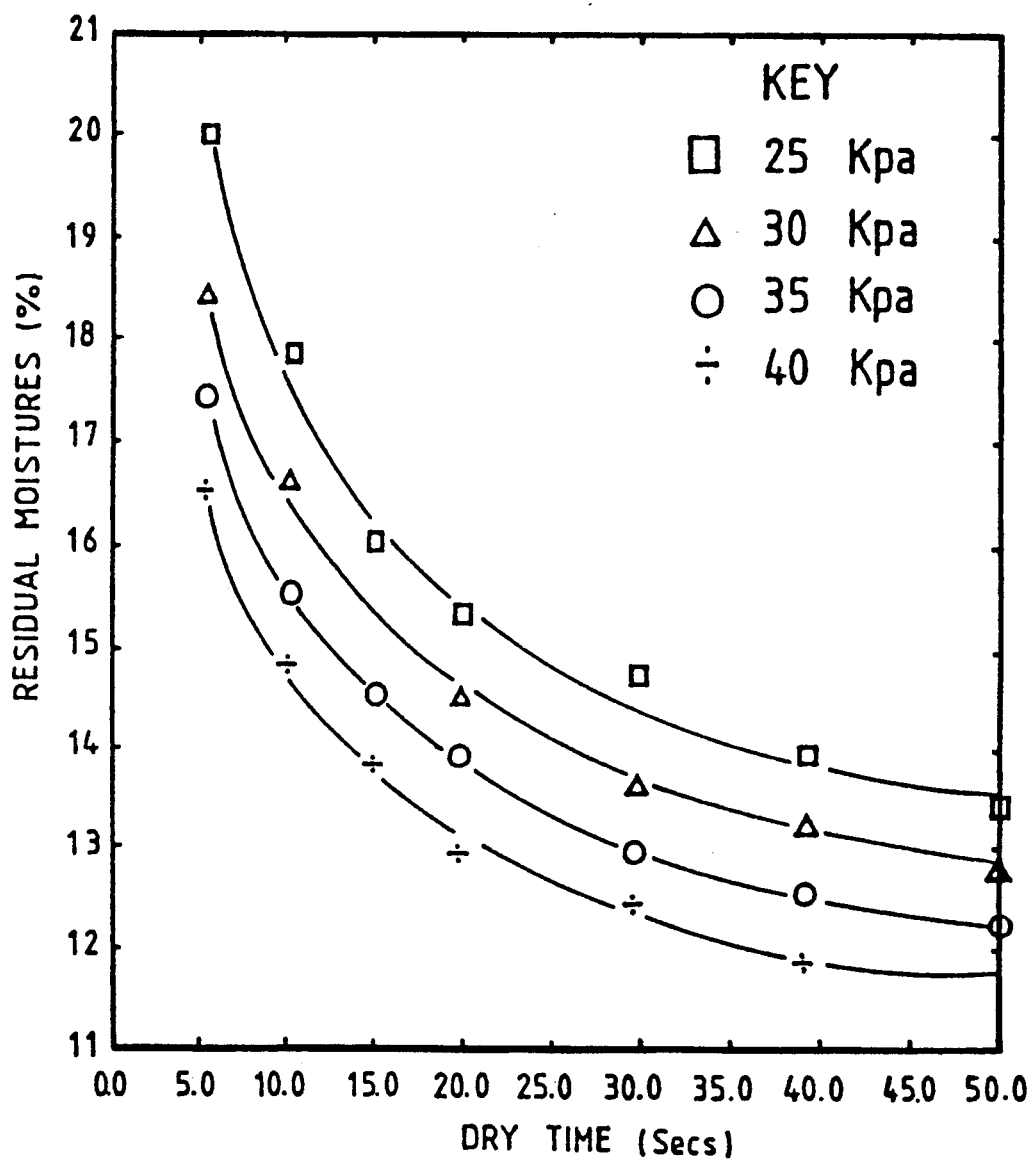
FIGS. 1 through 13 graphically show the residual moisture of the filter cake as affected by the various embodiments of the invention.

The composition of the first wash used in the laboratory tests was determined colorimetrically from the plant first wash. The final dry times and initial vacuums were set so that the cake moistures obtained in the laboratory were comparable to those obtained in the plant. This was achieved by carrying out dewatering tests with different initial vacuums and final dry times FIG. 1.0 shows the variation in moistures with vacuum and final dry time.

The plant product moistures, when no drainage aid is used, are approximately 12%. The laboratory conditions which resulted in similar moistures were an applied vacuum of 40 kPa and a dry time of 40 seconds. These compare favourably to the plant conditions 35–40 kPa vacuum and 40 second dry time. Under these conditions the laboratory results could be directly related to trends observed in the plant.

Dewatering Tests

Product hydrate and spent liquor were placed in the filtration rig and slurried using a mechanical stirrer. The slurry was filtered and, after a 15 second deliquoring, the first wash was added through a wash system designed to simulate the condensate wash trough used in the plant.

The cake was dewatered for 40 seconds. The final wash was then applied and dewatered for a further 40 seconds. The residual moistures were obtained by drying the cakes in an oven at 75° C. overnight.

All reagents were added as 1.0% solutions to the last wash unless stated otherwise. Typical dosage ranges used are shown in Table 2.0.

TABLE 2.0

Typical reagent dosages

| Volume of 1.0% solution in 300 mls of wash water | ppm in wash water | Applied dosage kg reagent/tonne hydrate |
| --- | --- | --- |
| 0.3 | 8 | 0.004 |
| 0.5 | 16 | 0.007 |
| 1.0 | 33 | 0.014 |
| 1.5 | 49 | 0.021 |
| 2.0 | 66 | 0.029 |
| 2.5 | 83 | 0.036 |
| 3.0 | 99 | 0.043 |

The plant dosage for the drainage aid presently used at a typical refinery (Drimax) is approximately 0.035 kg/tonne of hydrate. A series of nonionic and anionic surfactants were examined for their ability to reduce cake moistures. The reagents evaluated are listed in Table 3.0.

TABLE 3.0

Reagents tested and evaluated

| COMMERCIAL NAME | SUPPLIER | CHEMICAL COMPOSITION |
| --- | --- | --- |
| Drimax | Allied Colloids | 25% oleic acid 75% GN9 |
| Priolene | Unichema | Oleic acid |
| DDBSA | Harcros | Dodecylbenzene sulphonic acid. |
| Hostapur | Hoechst | Sodium alkyl sulphonate |
| Aerodri | Cyanamid | diisooctyl sulphosuccinate |
| Dowfax 2A1 3B2 | Dow Chemical | alkylated diphenyl oxide disulfonates |
| GNX Series | ICI | Nonylphenol ethoxylate (XEO) |
| G13A7 | ICI | Tridecanol ethoxylate (7EO) |
| G12A3 G12A23 | ICI | Dodecanol ethoxylate (3EO) (23EO) |
| G17A6 | | Heptadecanol ethoxylate (6EO) |

TABLE 3.0-continued

Reagents tested and evaluated

| COMMERCIAL NAME | SUPPLIER | CHEMICAL COMPOSITION |
| --- | --- | --- |
| G17A10 | | (10EO) |
| Sodium Lauryl Sulphate | Various | Dodecyl sulphate |

Adsorption of Oleic Acid onto Product Hydrate

A typical dewatering test was conducted in which only the final wash was collected. The fatty acid was introduced into the final wash at dosages of 0.021, 0.029 and 0.036 kg/tonne.

The primary equation used in dewatering theory is the Young-Laplace equation:

$$\Delta P = \frac{2\gamma \cos\theta}{r}$$

where $\Delta P$ is the differential pressure gradient required to empty a capillary of radius r filled with a fluid of surface tension $\gamma$ and contact angle $\Theta$. It is generally assumed that r remains constant during filtration (i.e., non-compressible cake).

The role of the surfactant is to reduce $\gamma$ so that smaller capillaries can be emptied at a given vacuum reducing residual cake moisture Reagents capable of maintaining a high pressure gradient across the filter cake have been shown to further improve the dewatering properties of hydrate.

Table 4.0 shows the reduction in moistures achieved at current plant dosage rates (0.036 kg/tonne hydrate) for the various reagents tested.

TABLE 4.0

Reduction in Moisture for Various Reagents Tested

| REAGENT | % MOISTURE REDUCTION |
| --- | --- |
| BLANK | 0.0 |
| DOWFAX 3B2 | 1.4 |
| G17A10 | 1.5 |
| G12A3 | 1.5 |
| G17A6 | 1.5 |
| GN12 | 1.6 |
| GN9 | 1.6 |
| DOWFAX 2A1 | 1.8 |
| GN5 | 1.8 |
| G12A23 | 2.0 |
| G13A7 | 2.0 |
| $C_{12}SO_4Na$ | 2.0 |
| G17A7 | 2.1 |
| DRIMAX | 3.0 |
| AERODRI 100 | 3.5 |
| HOSTAPUR SAS | 3.5 |
| DDBSA | 3.5 |
| PRIOLENE | 3.5 |

The reagents that produced the lowest moistures were those capable of producing low surface tensions (approx. 30–33 dynes cm$^{-1}$) and maintaining the pressure gradient. Drimax, Aerodri 100, Hostapur SAS, DDBSA and Priolene were able to maintain a vacuum of 37–38 kPa while the other reagents could only maintain 30 kPa or less.

Figure 2:
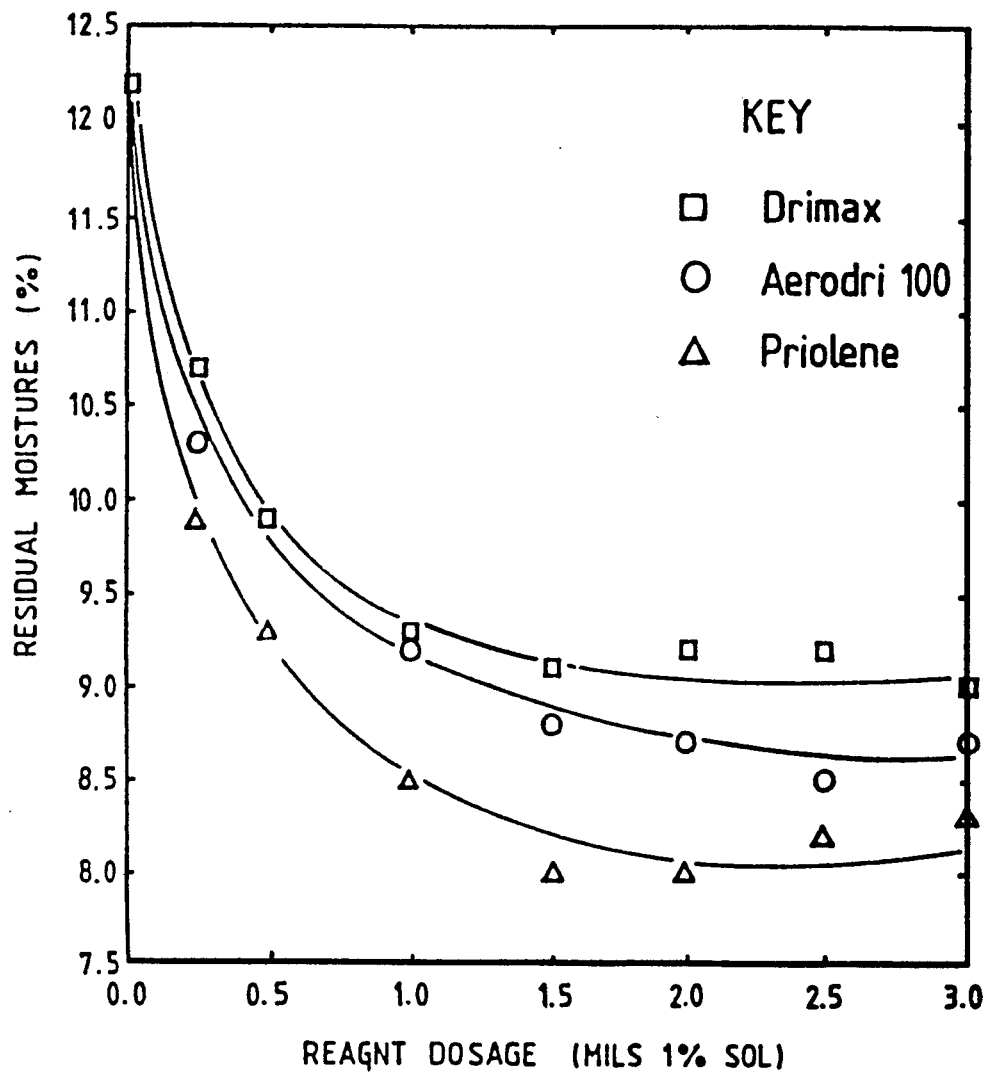

In order to further reduce moistures and/or residual soda levels, the time at which the wash water was applied was also varied. FIG. 2.0 shows how cake moistures vary with time during filtration.

The graph shows rapid initial dewatering after the application of the first wash water A moisture reduction of 4.5% is achieved in the first 10 seconds which gradually levels out with time (i.e % moisture level out to 0.5% over the last 10 seconds for the first wash).

In order to improve the final moistures, the dewatering time for the first wash was reduced by 10 seconds. The three reagents previously selected (Priolene, DDBSA, Drimax) were evaluated at 0.014, 0.021, 0.029 and 0.036 kg/tonne dosage rates.

Figure 3:
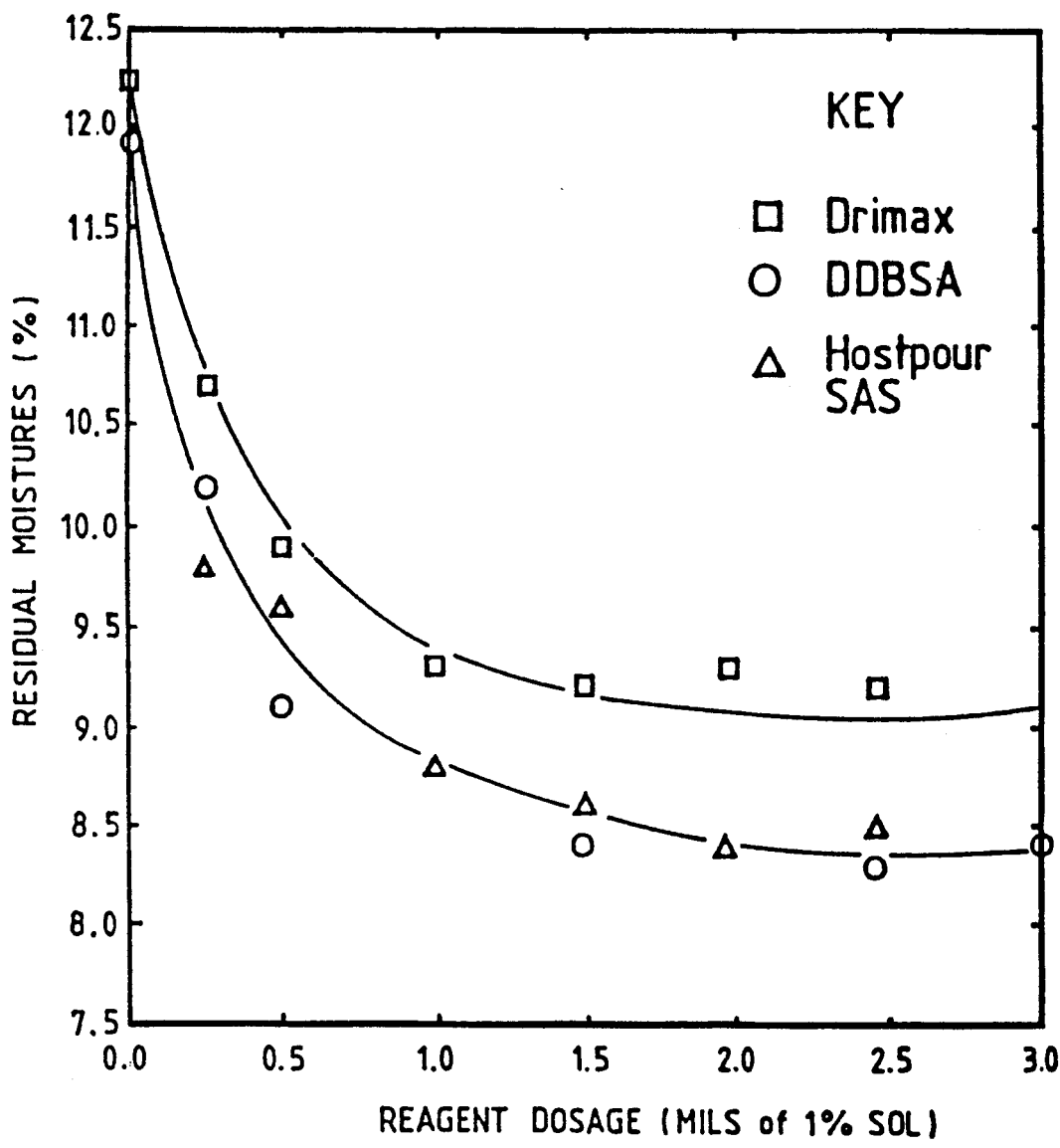

FIGS. 3.0, 3.1 and 3.2 show the variation in moistures with reagent dosage and dry time.

Figure 4:
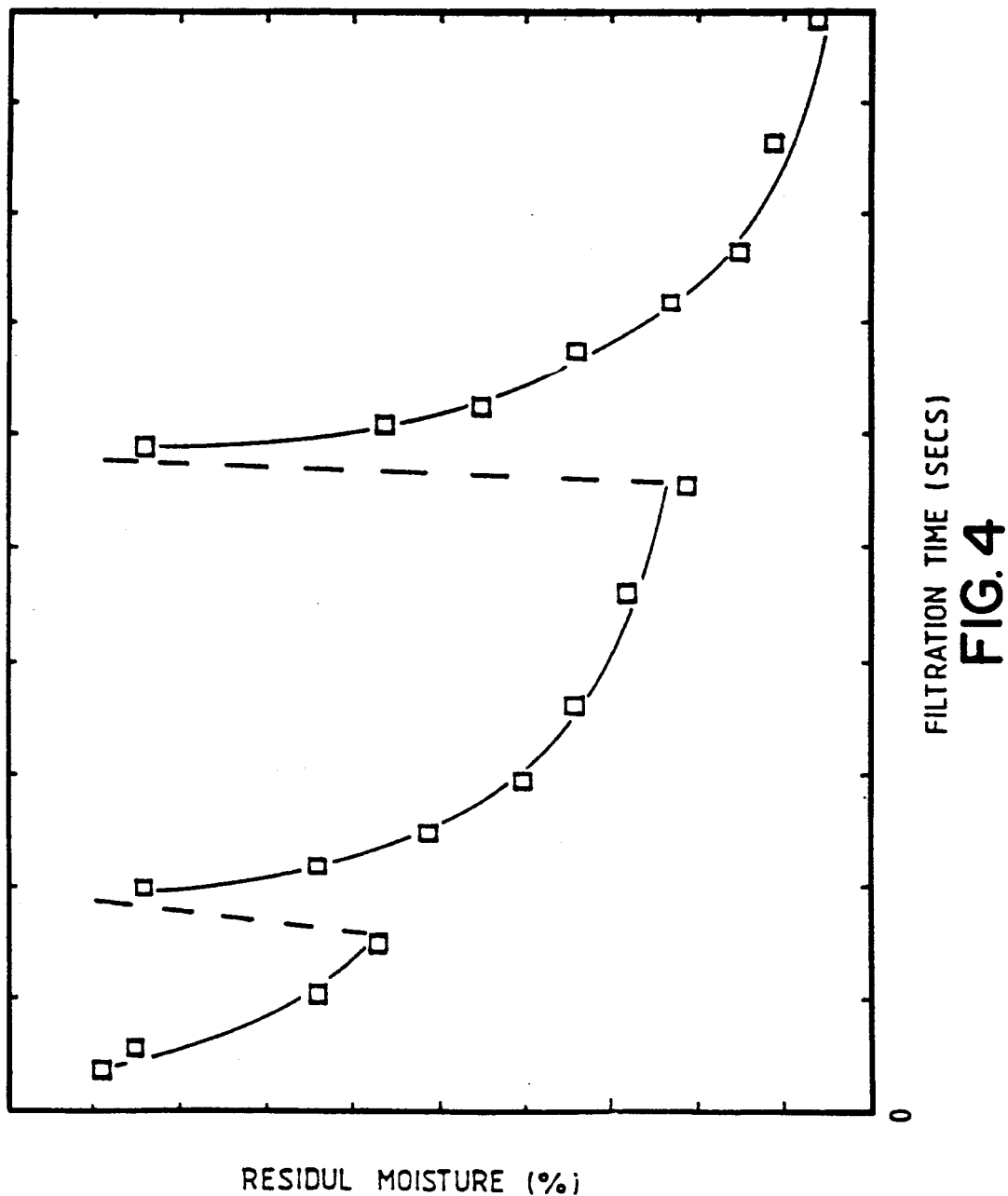

These figures indicate reduction in moistures for all the reagents tested. In each case, a 10 second increase in dry lime resulted in 0.5% lower moistures. However, the soda analysis does not give any indication as to the effect of moving the wash application on residual soda. In all cases the soda levels were very low, indicating more effective washing was achieved in the laboratory tests than in the plant. The results are also variable and no trends are evident. Therefore no conclusion can be drawn about the effect of moving the wash water application on soda levels. FIG. 4.0 shows the effect of dividing the reagent dosage between the two washes.

The mechanism by which vacuum pressure is maintained is thought to involve the adsorption of the reagent at the hydrate surface. The polar portion of the reagent adsorbs onto the hydrate surface while the hydrophobic end orientates itself out into the solution. As the capillaries drain during filtration and the hydrate particles approach closer together, a hydrophobic region is produced. This results in the exclusion of water from the capillary while reducing air-flow through the cake.

The surfactants capable of building pressure are also capable of increasing the contact angle between the hydrate and wash water due to adsorption of reagent. From the Young-Laplace equation a rise in contact angle would further improve dewatering of the product. The results show that the most effective dewatering aids tested reduced surface tension, increased contact angle and maintained vacuum pressure. The reagents which were not as effective are capable of reducing the surface tension but were not capable of maintaining vacuum pressure. It may also follow that these reagents do not increase contact angle.

Reagents chosen for further tests were selected based on the following criteria:
 (a) reagent performance
 (b) availability
 (c) handling
 (d) cost The Aerodri 100, Hostapur SAS, DDBSA and Priolene were all able to reduce moistures by approximately 3%. In comparison, the reagent currently being used (Drimax) reduces the moistures by 3.0. Aerodri 100 and Hostapur SAS are solids, making their implementation into the plant impractical. The DDBSA and Priolene are liquids which are readily available and easily integrated into plant operations. These reagents are also less expensive than the Aerodri 100 and Hostapur SAS Hence further tests were carried out using DDBSA and Priolene. Drimax was used as a reference.

A fixed reagent dosage of 0.036 kg/tonne was used. The reagent was divided 100/0, 80/20, 60/40, 40/60/ 20/80 and 0/100 between the first and last wash respectively. The Drimax showed a steady increase in moistures as the reagent dosage was progressively increased in the first wash and decreased in the last wash. The moistures increased from 9.2% for the 0/100 reagent dosage to 10.9% for the 100/0 reagent dosage. As the percent moistures increased a corresponding decrease in vacuum pressure from 37 kPa to 22 kPa was also noted.

The Priolene and DDBSA show a similar trend to the Drimax but to a lesser degree. An increase in moistures from 8.6% to 9.5% was observed as the Priolene application was divided from 0/1000 to 100/0 in the first and last wash respectively. This is further evidence for the strong adsorption of Priolene onto the hydrate surface.

The DDBSA showed an increase in moistures from 8.9% to 10.0% as the reagent was divided from 0/1000 to 100/0 in the first and last wash respectively. By dividing the reagent dosage to 20/80 or 40/60, the first wash may be more rapidly and more effectively dewatered with little effect on the final cake moistures. The ratio of reagent used however will depend on reagent carry-over from the last wash.

Due to the strong adsorption of Priolene onto the hydrate surface very little reagent carry-over is expected and therefore a divided reagent dosage of 40/60 for the first and last wash and respectively would be expected.

Figure 5:
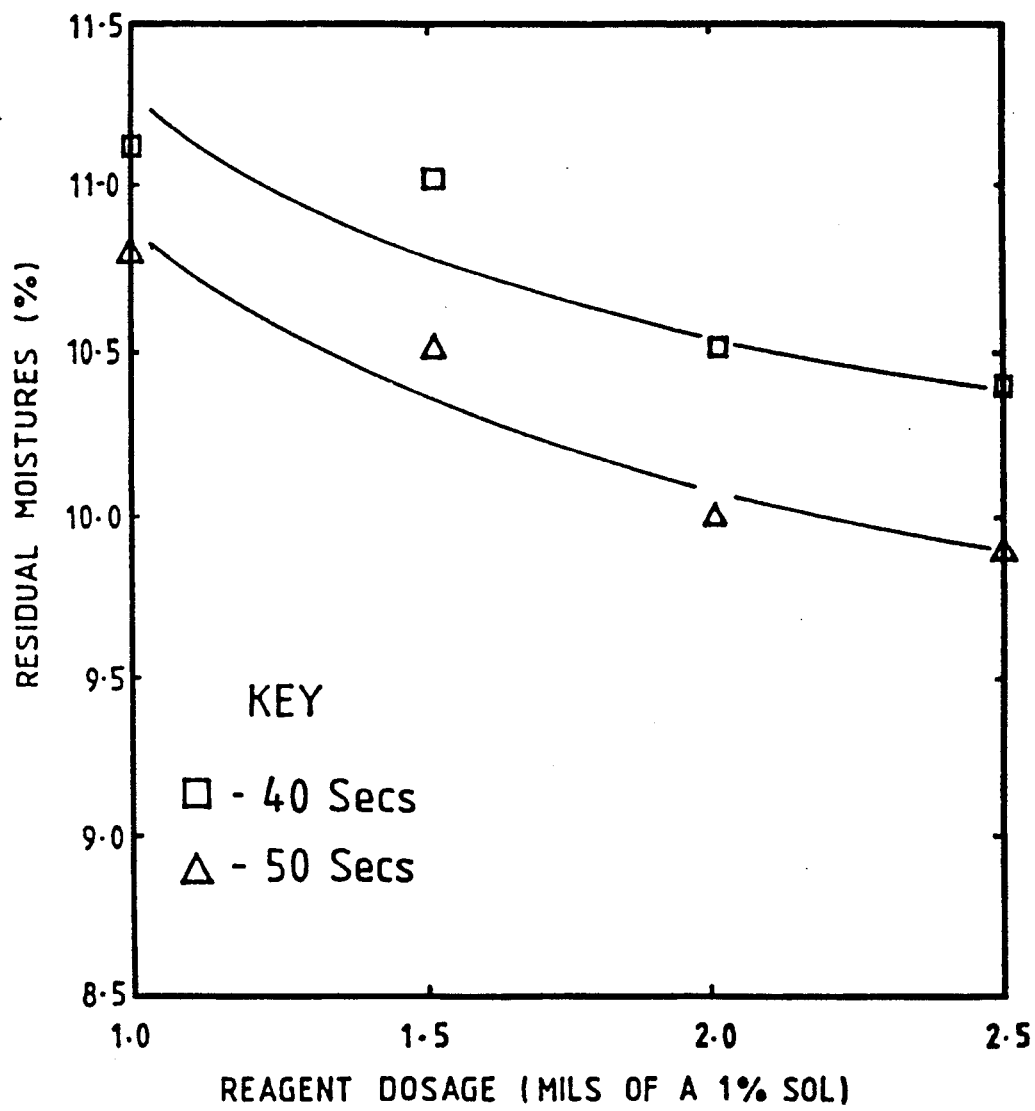

FIG. 5.0 shows that by using a divided reagent dosage of 40/60 the first wash may be dewatered by a further 1% using a 40 second dry time.

This method of reagent application should result in lower sodas. Alternatively, the final wash may be introduced 10-15 seconds earlier (i.e., first wash dewatering time of 25-30 seconds). In this case the first wash will have dewatered to the same extent as the blank after 40 seconds. This will allow an extended final dry time without incurring an increase in soda levels.

On a cost performance basis, the oleic acid is the most effective reagent available It produces the lowest moistures at the lowest cost The reagent has been shown to adsorb strongly onto the hydrate surface resulting in a relatively small amount (i.e., less than 10% of applied reagent) entering the process stream.

Before the oleic acid can be implemented into the plant, it is desirably causticised for complete conversion to the corresponding salt. The first wash generally does not require a pre-causticisation step due to the high caustic concentration inherent in this stream and the low reagent dosage employed.

The caustic injection is advantageously made prior to the addition of Priolene and can be mixed by an in-line mixer (bazooka) or a make-up system. All the fatty acid is desirably converted to the salt. If free acid is present the pores within the cake may seal and slow down the passage of surface water through the cake resulting in higher residual moistures.

The final wash can be applied closer to the first wash. This procedure has the potential to reduce the moistures by a further 1.0% over the present values at approximately one half to one third the cost.

Further comparative experiments were carried out for two commercial blends of dewatering aid, DRIMAX and A1203B, both of which are blends of oleic acid and nonylphenol (9 molar) glycol ether. These blends were analysed as containing 75/25 and 50/50 of nonylphenol glycol ether to oleic acid respectively.

The First System

Approximate)y 900 g of alumina trihydrate was placed in the filter rig. Spent liquor (540 ml at 70°-80° C.) were added and stirred to form a homogeneous slurry (about 30 seconds). The slurry was filtered immediately to avoid settling of particles at an initial vacuum pressure of 40 kPa. After disappearance of surface moisture (i.e., once the cake was fully exposed) the stop clock was switched on and a dry time of 15 seconds was allowed to pass. The Teflon cup was then placed on the rig and the first wash was added (300 ml of 10% liquor at 70°-80° C.). The cup was removed and the clock was switched on again after all surface moisture disappeared After a further 40 seconds, the second wash was applied through the Teflon cup (300 ml condensate and dewatering aid added as 1.0% wt/wt solution all at 70°-80° C.). The cup was then removed and after all the cake surface was exposed, 40 seconds of dewatering time was allowed. Just prior to the end of the 40 seconds, the final pressure was recorded and then the vacuum was disengaged via the tap controlling the ball valve mechanism The rig was then removed from its stand and buchner funnel. The internal rim of the collar was wiped free from any moisture and water droplets which could cause possible cake contamination, the cake was removed completely by inverting the collar on a pre-weighed aluminium pan. Any remaining cake in the collar was carefully scraped out with a spatula. The pan with the wet cake was weighed in an oven at 70° C. overnight. The weight of the pan and dry cake were recorded and the percentage moisture determined according to equation (3).

$$\% \text{ Moisture (wt \%)} = \frac{\text{(Wet weight} - \text{Dry weight)}}{\text{(Wet Weight} - \text{Pan Weight)}} \times 100 \quad (3)$$

The Second System

Alumina trihydrate (approximately 600 g) was placed in the filter rig and slurried with diluted spent liquor (250 ml of 38% liquor at 70°-80° C.) for about 30 seconds. The slurry was then filtered at an initial pressure of 50 kPa. On cake surface exposure, 15 seconds were allowed to pass before the 350 ml of condensate and dewatering aid added as 1.0% wt/wt solution were applied via the spray mechanism (Teflon cup). After all the cake surface moisture disappeared a further 60 seconds of dewatering time was allowed. The final pressure was recorded before the vacuum was turned off. The rig was removed, wiped free of internal collar moisture and inverted to remove the cake. The weight of the aluminium pan, wet cake and dry cake (after drying at 70° C. overnight) were recorded and the percentage moisture calculated.

Dosages

In order for the laboratory dewatering aid dosage tests to make any sense, it is important to compare them to their equivalent plant values Tables 4 and 5 show the laboratory dosages and their equivalent plant values for the first and second alumina refineries respectively.

TABLE 4

| Dose Rates for First Refinery | | |
|---|---|---|
| Dosage (ml of 1% solution in 300 ml wash) | Concentration (ppm) | Equivalent Applied Plant Dosage (g/tonne) |
| 0.0 | 0.0 | 0 |
| 0.2 | 6.7 | 4 |
| 0.4 | 13.3 | 9 |
| 0.8 | 26.7 | 17 |
| 1.0 | 33.3 | 22 |
| 1.5 | 50.0 | 33 |
| | 66.7 | 43 |
| 2.5 | 83.3 | 54 |
| 3.0 | 100.0 | 65 |
| 4.0 | 133.3 | 87 |

TABLE 5

| Dose Rates for Second Refinery | | |
|---|---|---|
| Dosage (ml of 1% solution in 250 ml wash) | Concentration (ppm) | Equivalent Plant Dosage (g/tonne) |
| 0.0 | 0 | 0 |
| 0.2 | 8 | 5 |
| 0.4 | 16 | 10 |
| 0.8 | 32 | 21 |
| 1.0 | 40 | 26 |
| 1.5 | 60 | 39 |
| 2.0 | 80 | 52 |
| 2.5 | 100 | 65 |
| 3.0 | 120 | 78 |
| 4.0 | 160 | 104 |

Performance Testing of the Dewatering Aids

The First Dewatering Circuit

Figure 6:
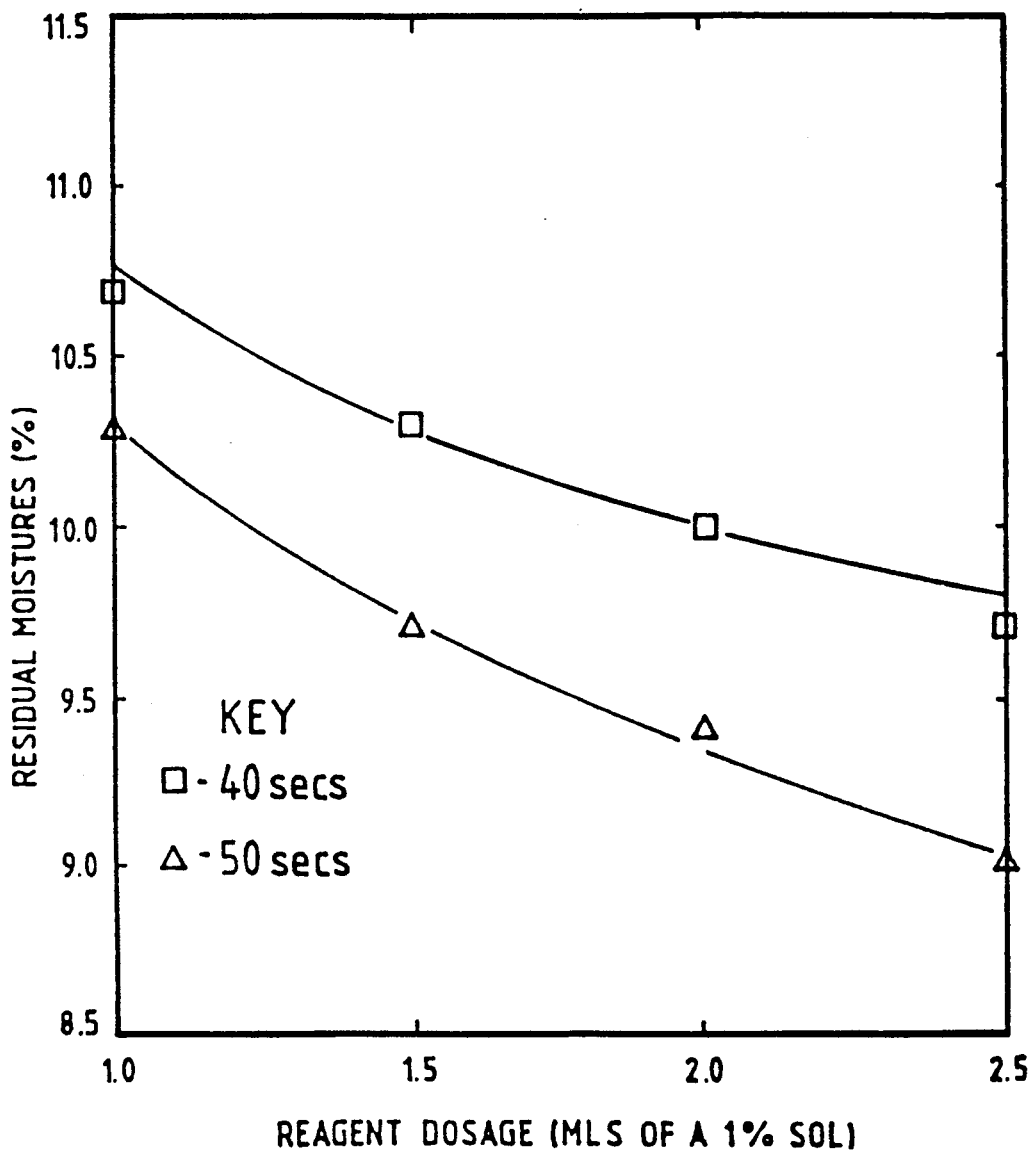

Using the procedure outlined for the first system, reagent dosage tests were conducted on the Priolene and Drimax chemicals. The results of cake moisture versus dosage are shown in FIG. 6. They clearly show that cake moistures decrease more rapidly with Priolene than with the Drimax reagent above 0.8 ml dosages. At a dosage of 2.0-2.5 ml, which corresponds to normal plant dosages, the cake moistures for Priolene were about 1% lower than those for Drimax ($\approx 8.5\%$). Drimax currently produces moistures of about 7.5% in the plant at these dose rates, however, since this is a comparative study, absolute values cannot be used to evaluate the performance of drainage aids. Since a 1% decrease was observed in the laboratory, a similar decrease in cake moistures should be expected on the industrial scale.

The Priolene is observed to consistently decrease cake moistures over the 4.0 ml dose range while the Drimax product loses its effectiveness after only 1.5 ml. The lowest observed cake moisture of 7.2% for Priolene occurred at the highest dosage tested i.e., 4.0 ml. Drimax could only achieve a cake moisture of 8.3% after a 1.5 ml does. At a similar dose, Priolene was achieving cake moistures of 7.9%.

Figure 7:
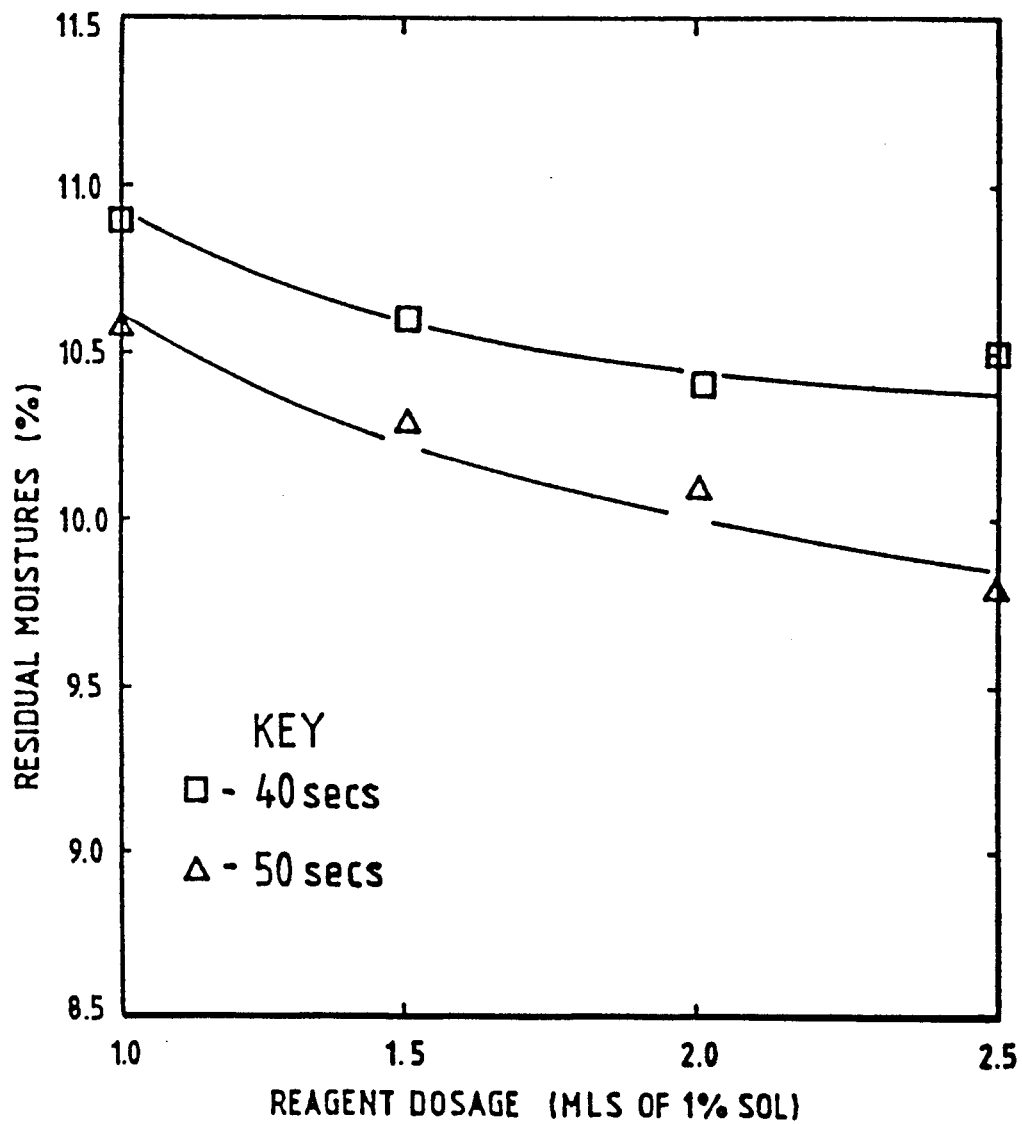

FIG. 7 shows the changes in final vacuum pressure observed with increasing dosage. The pressures obtained are greater for Priolene than for Drimax below 2.5 ml and lower after 2.5 ml dosages. Drimax, which contains 75% GN9 and 25% Priolene, has been shown to produce similar $\Delta P^1$ rises with an overall slightly higher final pressure over the 1.7-4.0 ml dose range. This suggests that the Priolene could be lowering the surface tension ($\gamma$) and/or increasing the contact angle ($\Theta$) to produce overall lower cake moisture over this dose range.

The Second Dewatering Circuit

Figure 8:
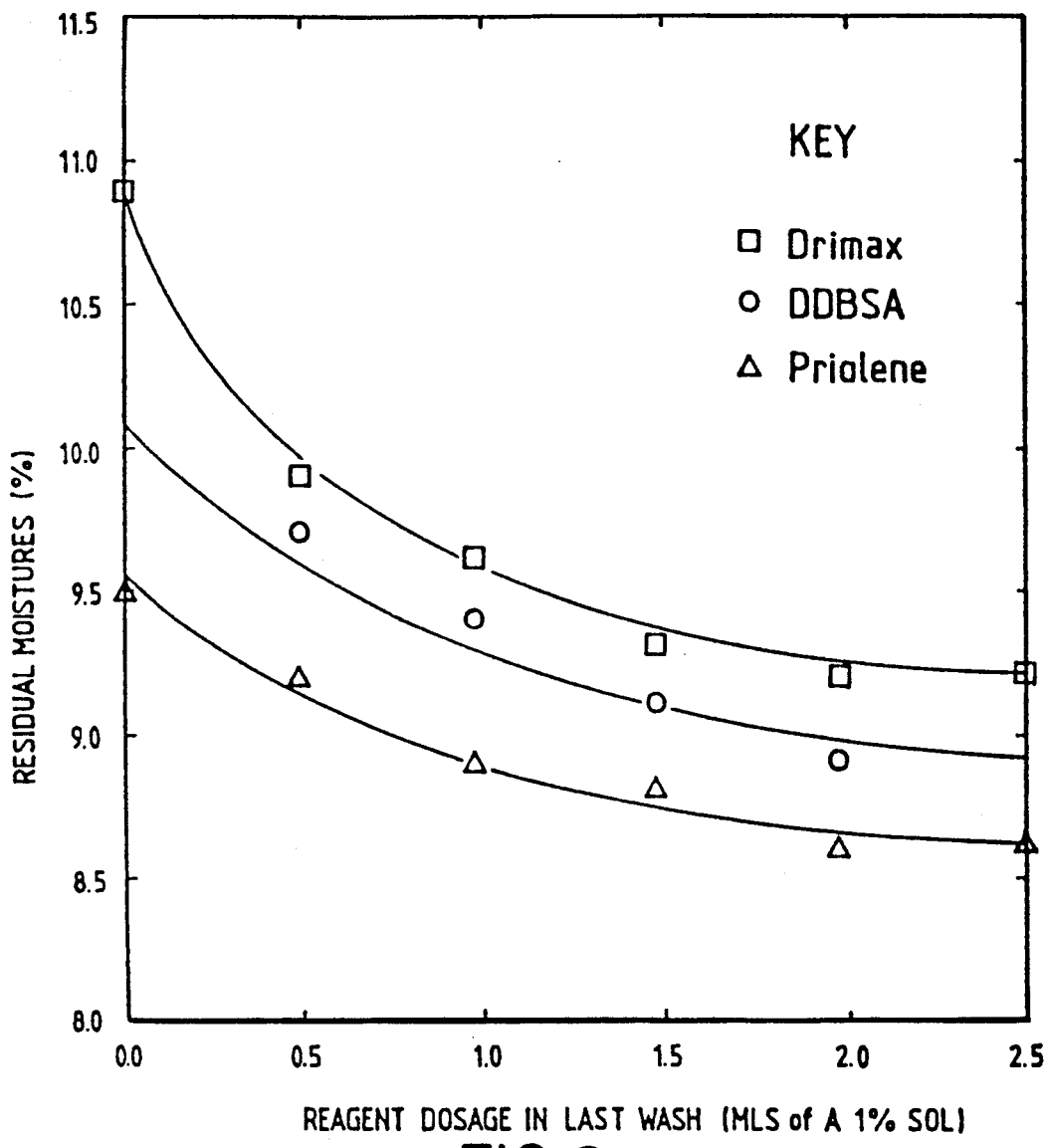

Priolene and A1203B were both tested on the second system using the procedure outlined above. As with the first system, both the cake moistures and corresponding final vacuum pressures were recorded wIth changes in dewatering aid dosage. FIG. 8 shows the comparative performances of the two chemicals in reducing cake moisture. As with the first system, initially a greater decrease in moisture is observed for the commercial dewatering aid at low dosages. Both chemicals produce equal cake moistures of 10.5% at around a dosage of 1.7 ml. Priolene produces lower cake moistures ($\approx 10.3\%$) than A1203B ($\approx 10.6\%$) over the normal plant dosage range of 2.0-2.5 ml. It is important to note that the A1203B loses its effectiveness after a dosage of 1.5 ml while Priolene continues to reduce cake moistures up to dosages of 3.0 ml. The lowest observed cake moistures were 11.1% for A1203B and 10.1% for Priolene both recorded at 4.0 ml.

Figure 9:
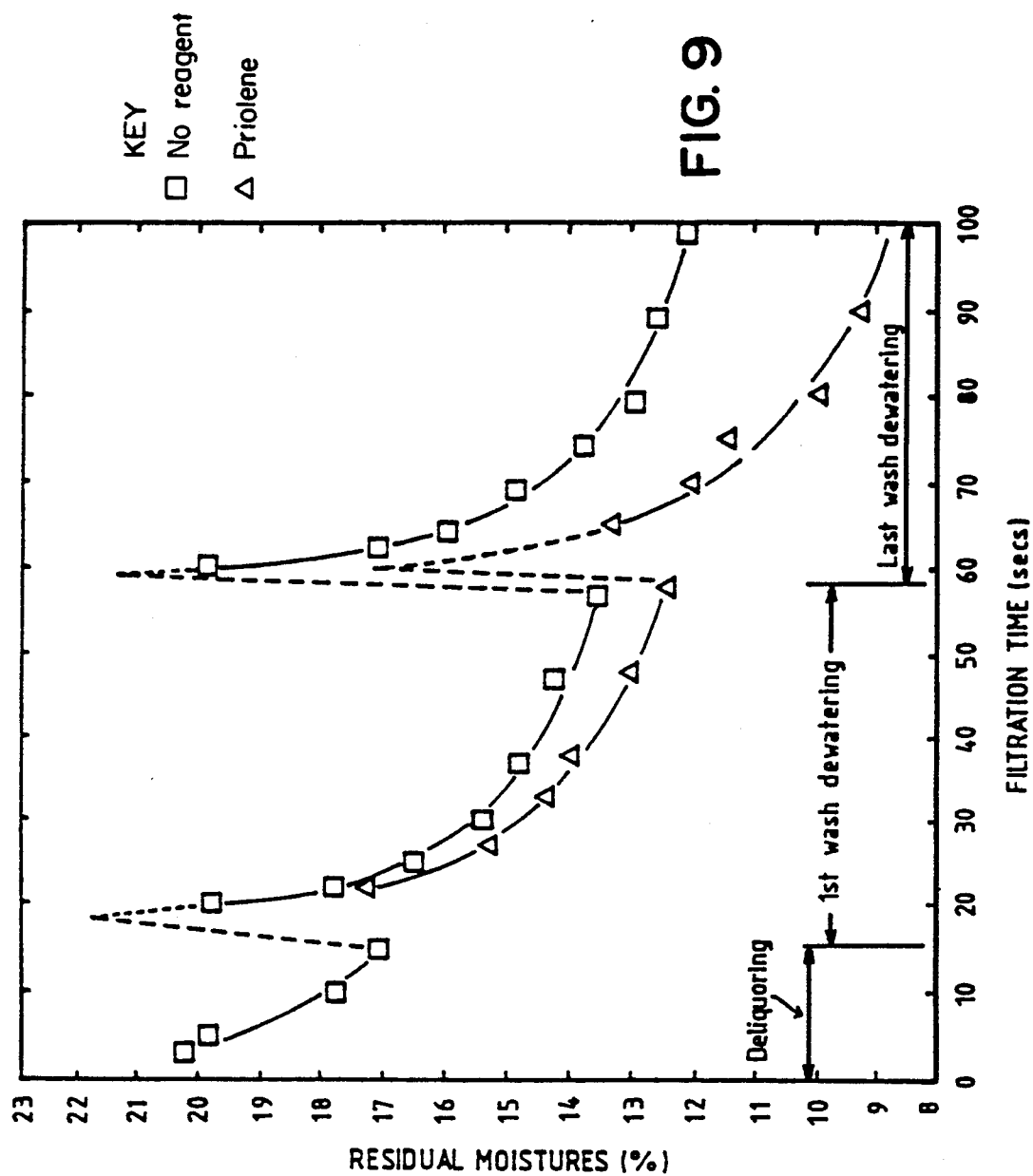
Figure 10:
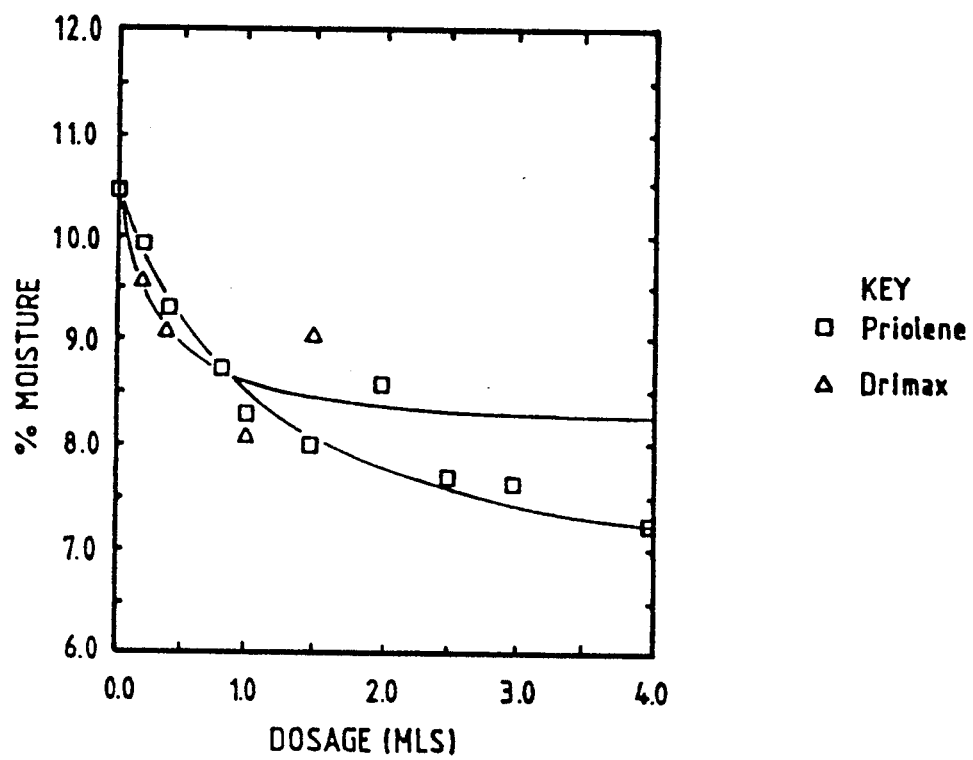
Figure 11:
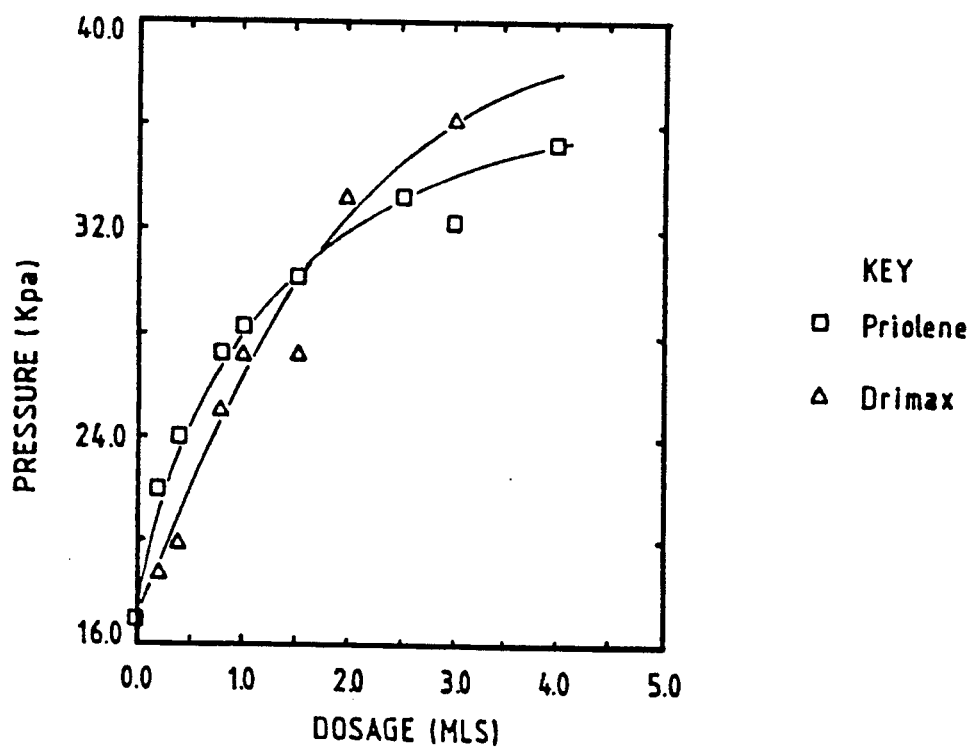
Figure 12:
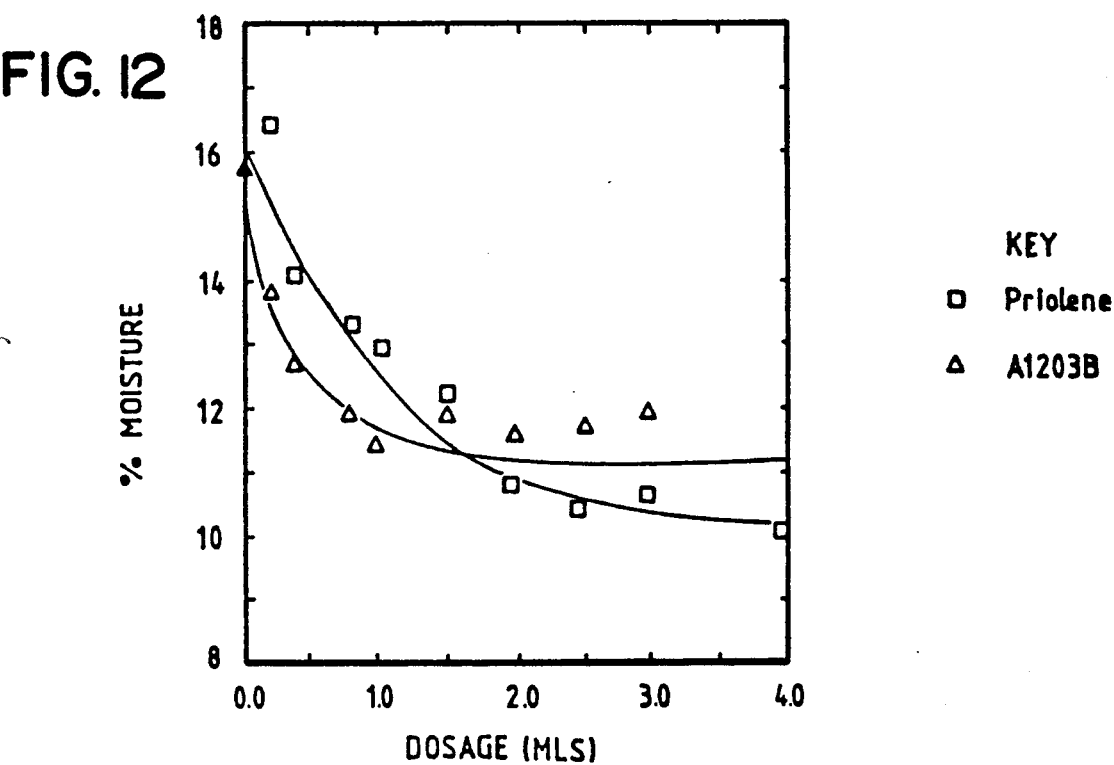
Figure 13:
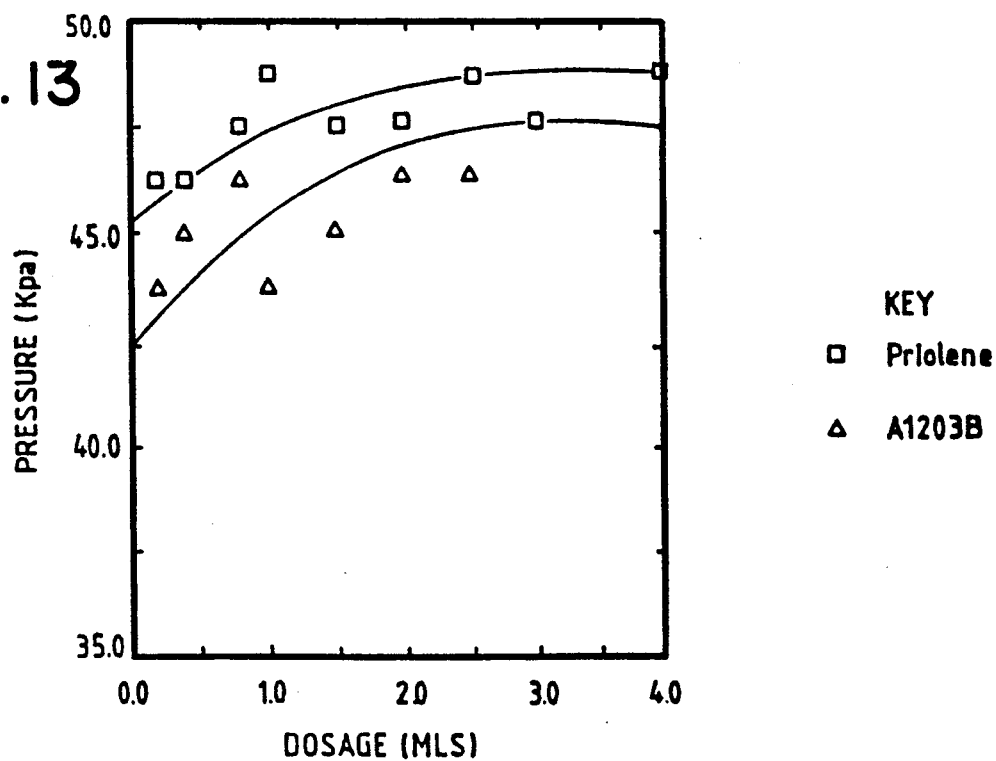

FIG. 9 demonstrates the Priolene phenomena. Priolene is observed to produce higher final pressures over the dosage range. The A1203B reagent follows the same pressure trend but at a lower level, probably due to the lower content of Priolene in the product (i.e., ≡0% Priolene). From these results, it is suggested that the Priolene produces overall lower cake moistures due to increases in the pressure.

The Analysis of A1203B and Drimax commercial dewatering aids showed that each contained a simple blend of 9 molar alkylphenol polyglycol ether (GN9) and oleic acid. Drimax and A1203B were shown to contain 75/25 and 50/50 ratios of GN9 to oleic acid respectively.

The new fatty acid dewatering aid process was shown to work extremely well on the test refinery circuits. The water soluble sodium, oleate showed greater reductions in filter cake moistures compared to the commercial blends over the equivalent plant dosage rates.

By using liquid fatty acid and synthesizing the water soluble salt with readily available caustic soda, the problem of handling, storage and dissolving solid fatty acid salts before application on an industrial scale is avoided. The experimental results also shows that the expensive ether component in the commercial dewatering aids is not required for effective dewatering performance.

Using the new in line synthesis process, a very cost effective method of dewatering alumina trihydrate, which provides significant decreases in cake moistures, is achieved.

The claims defining the invention are as follows:

1. A method which involves reducing the moisture content of an alumina trihydrate filter cake which is produced by filtering a slurry of alumina trihydrate solids obtained by the Bayer process in the processing of alumina, comprising contacting the alumina trihydrate filter cake with a product obtained by mixing an alkaline liquor and a $C_8$ to $C_{20}$ fatty acid or fatty acid precursor or blend of said fatty acid and precursor.

2. A method as claimed in claim 1, wherein
   (a) the alumina trihydrate filter cake is washed with a liquor including said product, or
   (b) the product is added to a bayer liquor slurry prior to filtration of the alumina trihydrate.

3. A method as claimed in claim 1 or claim 2 wherein the alkaline liquor contains sodium hydroxide.

4. A method as claimed in claim 3 wherein the alkaline liquor is a Bayer process liquor.

5. A method as claimed in claim 3, wherein said fatty acid is oleic acid.

6. A method as claimed in claim 1 or 2, wherein said fatty acid is added in an amount of at least 5 grams/tonne of aluminum hydroxide (calculated as $Al_2O_3$) filtered.

7. A method according to claim 2 wherein said filter cake is washed with said liquor including said product.

8. A method as claimed in claim 2, wherein
   (a) the alkaline liquor and fatty acid are consecutively injected into a stream of said slurry,
   (b) said stream containing the alkaline liquor and fatty acid is mixed, forming a fatty acid salt,
   (c) the alumina trihydrate filter cake is treated with said stream which contains said fatty acid salt, and
   (d) the alumina trihydrate of the slurry is subsequently filtered and dewatered or deliquored.

9. A method according to claim 8 or claim 7 wherein said alkaline liquor contains sodium hydroxide.

10. A method according to claim 9 wherein said alkaline liquor is a Bayer process liquor.

11. A method according to claim 10 wherein said fatty acid is oleic acid.

12. A method according to claim 11 wherein said oleic acid is added in an amount of at least 5 grams/tonne of aluminum hydroxide (calculated as $Al_2O_3$) filtered.

13. A method according to claim 12 wherein said oleic acid is added in an amount of 50 to 70 grams/tonne of aluminum hydroxide.

14. A method as claimed in claim 1 further comprising the steps of
    recovering and recirculating said alkaline liquor after said alumina trihydrate filter cake has been contacted therewith, and contacting said filter cake with said recirculated liquor.

15. In the method involving the dewatering of an alumina trihydrate filter cake which is produced by filtering a slurry of alumina trihydrate solids obtained in the processing of alumina, the improvement comprising the step of
    contacting the alumina trihydrate filter cake with an alkaline process liquor stream to which has been added a $C_8$ to $C_{20}$ fatty acid or fatty acid precursor, the amount of fatty acid or precursor being at least about 5 grams/tonne of aluminum hydroxide (calculated as $Al_2O_3$) filtered.

16. A method as claimed in claim 15, including adding further alkali to said stream to enhance conversion of the fatty acid to the appropriate fatty acid salt.

17. A method according to claim 15 or 16 wherein aid amount is 50 to 70 grams/tonne of aluminum hydroxide.

18. A method according to claim 17 wherein said acid is olelic acid.

* * * * *